United States Patent [19]
Komrska

[11] Patent Number: 5,631,538
[45] Date of Patent: May 20, 1997

[54] METHOD AND APPARATUS FOR CHARGING A DETACHABLE BATTERY

[75] Inventor: Dean M. Komrska, Buffalo Grove, Ill.

[73] Assignee: Motorola, Inc., Schaumburg, Ill.

[21] Appl. No.: 628,172

[22] Filed: Apr. 4, 1996

[51] Int. Cl.[6] .......................... H01M 10/44; H01M 10/46
[52] U.S. Cl. .................. 320/21; 320/29; 320/30; 320/31
[58] Field of Search ...................... 320/12, 13, 14, 320/27, 28, 29, 21, 30, 39, 40, 48, 19, 31

[56] References Cited

U.S. PATENT DOCUMENTS

| | | | |
|---|---|---|---|
| 4,659,994 | 4/1987 | Poljak | 320/48 X |
| 4,755,733 | 7/1988 | Laliberté | 320/15 |
| 4,992,720 | 2/1991 | Hata | 320/23 |
| 5,185,566 | 2/1993 | Goedken et al. | 320/48 |
| 5,237,257 | 8/1993 | Johnson et al. | 320/2 |
| 5,471,128 | 11/1995 | Patino et al. | 320/13 |
| 5,539,299 | 7/1996 | Fernandez et al. | 320/39 |

*Primary Examiner*—Edward Tso
*Attorney, Agent, or Firm*—John J. King

[57] ABSTRACT

A unique method and apparatus for charging a battery enables the safe and efficient charging of a battery (102) which may be removed during charging. An electronic device (106) may not be adapted to be powered by the external power supply (114) without a detachable battery, or more importantly, the internal circuitry (200) may be damaged when the detachable battery is removed while the power supply is attached. Also, a battery may not be properly charged if a battery is replaced in the middle of a charging program for the battery. By periodically interrupting (306) the charging current, a device may turn itself off before circuitry or components are damaged if a battery is removed, and reset the charging program to correctly charge a battery if the battery is replaced.

14 Claims, 3 Drawing Sheets

METHOD AND APPARATUS FOR CHARGING A DETACHABLE BATTERY

FIELD OF INVENTION

The present invention is generally related to battery powered devices, and more particularly, to a method and apparatus for charging a battery of a battery powered device.

BACKGROUND OF THE INVENTION

As technology continues to advance, electronic devices continue to become smaller in size, opening new markets for portable electronic devices. These electronic devices typically are adapted to accommodate rechargeable batteries which are either internal to the device or detachable. Many electronic devices are adapted so the detachable battery may be charged while still attached to the electronic device. Such a detachable battery could be charged by applying a source of charging current to the electronic device, which includes circuitry to charge the detachable battery.

However, such a charging arrangement may be detrimental to the electronic device if the detachable battery is removed while the external power supply is attached to the portable electronic device. For example, the electronic device may not be designed to be powered by the external power supply without a detachable battery. Accordingly, when the detachable battery is removed, the electronic device may not operate properly. More importantly, internal circuitry and components may be damaged when the detachable battery is removed. That is, the power supply used to recharge the battery may overpower the internal circuitry or other components if the battery is removed, causing damage to the electronic device.

Also, a battery may not be properly charged if it is attached to the electronic device after a battery had been removed while the power supply is attached. Batteries are typically charged according to predetermined algorithms to ensure efficient and safe charging the battery. Therefore, if a battery is removed during the charging process and a different battery is attached, the attached battery may not be charged properly if the electronic device is in the middle of a charging program for the battery.

Accordingly, there is also a need for a method and apparatus for charging a detachable battery which may be removed during charging.

There is also a need for a method and apparatus for charging a detachable battery without damaging the electronic device.

DETAILED DESCRIPTION OF THE INVENTION

A unique method and apparatus for charging a battery enables the safe and efficient charging of a battery which may be removed during charging. Recharging a battery may be detrimental to a electronic device if the battery is removed while the external power supply is attached to the electronic device. For example, the electronic device may not be adapted to be powered by the external power supply without a detachable battery, or more importantly, the internal circuitry may be damaged when the detachable battery is removed while the power supply is attached. Also, a battery may not be properly charged if a battery is replaced in the middle of a charging cycle for the battery. By periodically interrupting the charging current below the current requirements of the device according to the present invention, a device may turn itself off before circuitry or components are damaged if a battery is removed, and reset the charging program to correctly charge a battery if the battery is replaced. While the present invention finds particular applicability with a device and corresponding battery having only positive and ground contacts, the invention could be used in connection with a device and battery having additional contacts.

Figure 1:
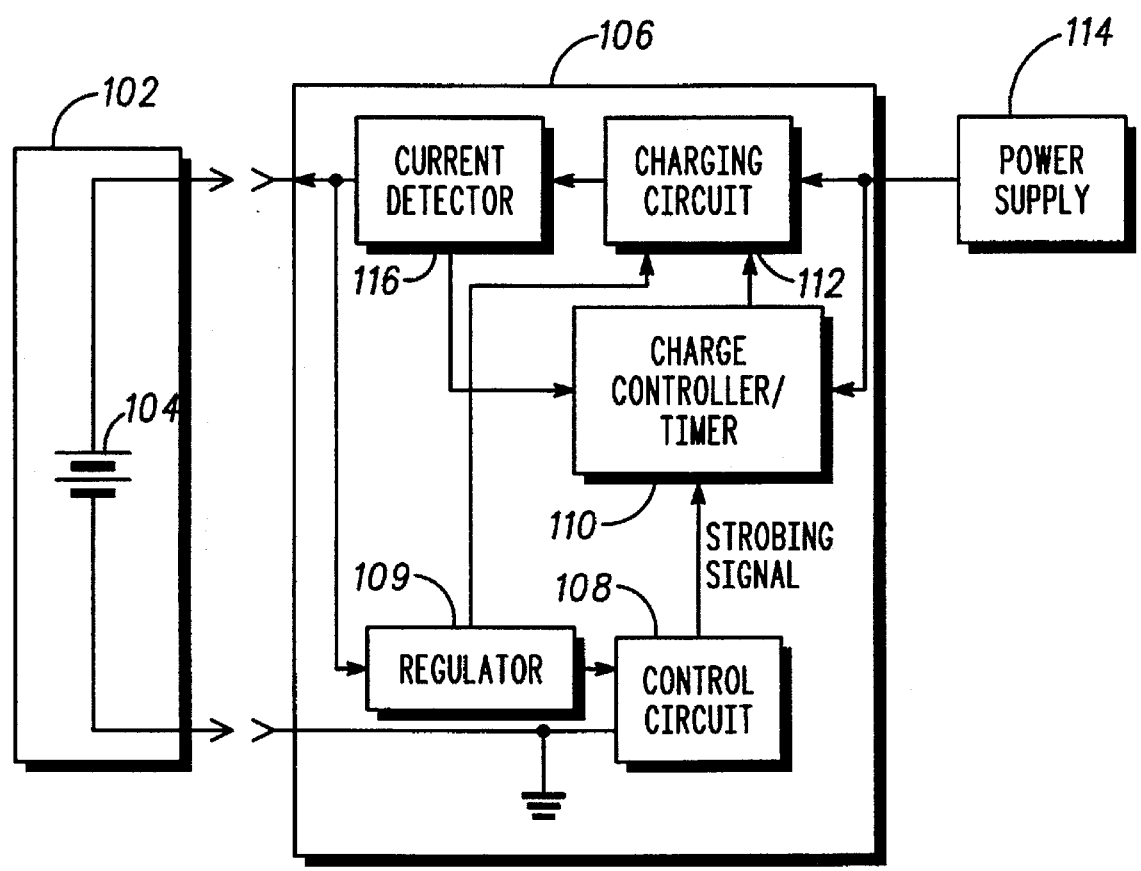
FIG. 1 is a block diagram of a portable electronic device having a detachable battery according to the present invention.

Turning now to FIG. 1, a portable electronic device 100 comprising a detachable battery 102 having one or more cells 104 is coupled to electronic circuitry portion 106. The electronic circuitry preferably comprises a control circuit 108 which is adapted to receive a regulated voltage from regulator 109 and is coupled to a charge controller/timer 110 for controlling a charging circuit 112. Charging circuit 112 is powered by a power supply 114 and provides charging current to a current detector 116. The current detector is coupled to a positive terminal of the battery 102. The current detector also provides a feedback path to charge controller/timer 110. Also, the output of the current detector is coupled to regulator 109.

Figure 2:
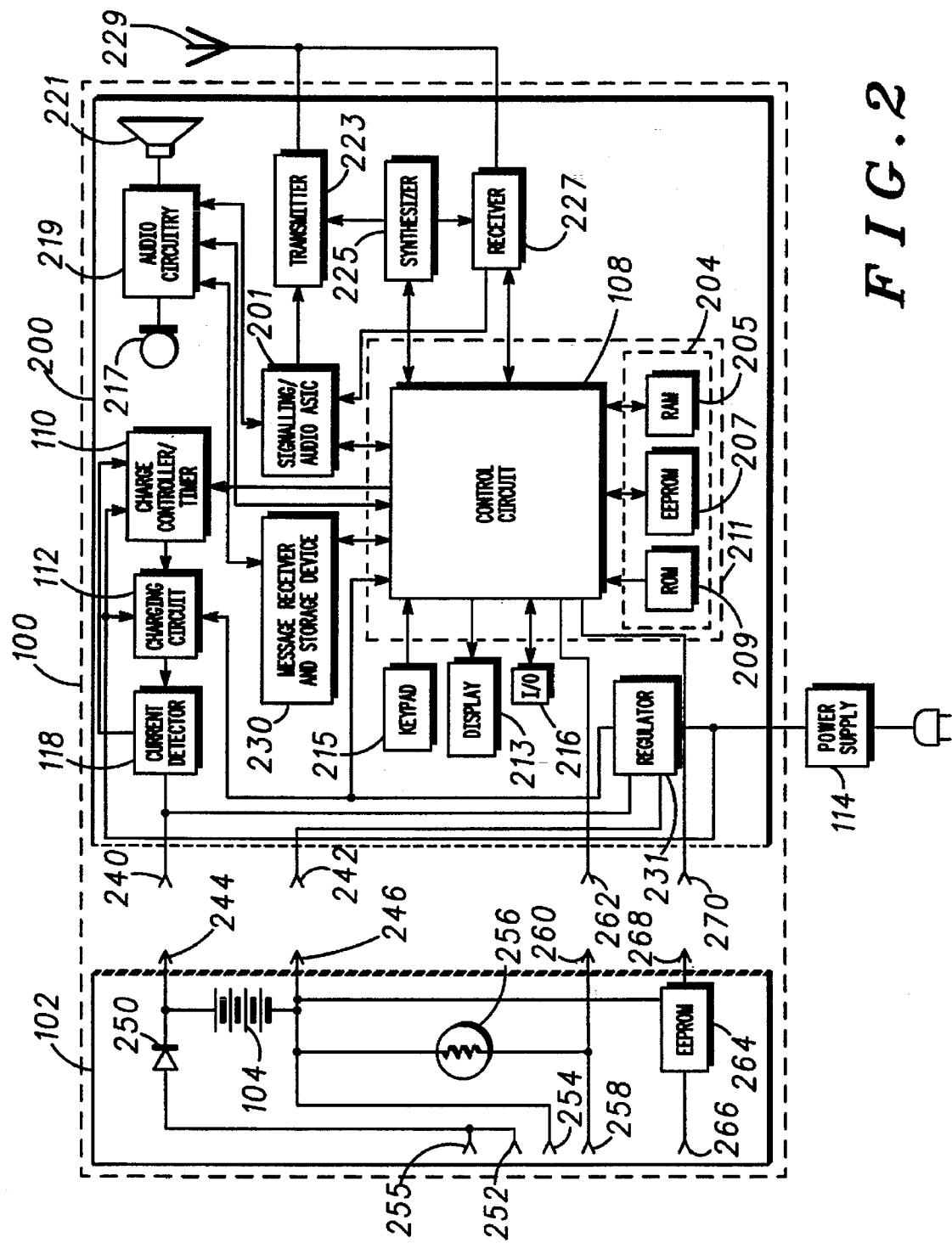
FIG. 2 is a block diagram of a wireless communication device having a detachable battery according to the present invention.

Turning now to FIG. 2, an exemplary portable electronic device 100 comprises battery 102 coupled to transceiver portion 200 of a wireless communication device. Transceiver portion 200 preferably comprises a signaling/audio ASIC 201, such as a CMOS ASIC available from Motorola, Inc. and control circuit 108, such as a 68HC11 microprocessor also available from Motorola, Inc., or some other processing circuit, which combine to generate the necessary communication protocol for communicating with a base station such as a cellular base station. Control circuit 108 uses memory 204 comprising RAM 205, EEPROM 207, and ROM 209, preferably consolidated in one package 211, to execute the steps necessary to generate the protocol and to perform other functions for the wireless communication device, such as writing to a display 213, accepting information from a keypad 215, accepting input/output information by way of a connector 216, or controlling a frequency synthesizer 225. ASIC 201 processes audio transformed by audio circuitry 219 from a microphone 217 and to a speaker 221.

Transceiver portion 200 processes the radio frequency signals. In particular, a transmitter 223 transmits through an antenna 229 using carrier frequencies produced by a frequency synthesizer 225. Information received by antenna 229 of the mobile unit enters receiver 227 which demodulates the symbols using the carrier frequencies from frequency synthesizer 225. The mobile unit may optionally include a message receiver and storage device 230 including digital signal processing means. Transceiver portion 200 further includes a regulator 231 which receives power by way of a power supply 114 and provides a regulated output to charging circuit 112. Power supply 114 could be a transformer converting conventional AC power to a DC voltage, or could be a cigarette lighter adapter coupling DC power of an automobile to the device. Transceiver portion 200 further includes power contact 240 and ground contact 242 adapted to be coupled to a battery contact 244 and a ground contact 246, respectively, of battery 102.

Battery 102 preferably comprises a rechargeable cell 104 coupled between battery contact 244 and ground contact 246 and further comprises a diode 250 to prevent discharging of the battery if a charging contact 252 is shorted to ground contact 254 or when charging contact 252 is mated with a charging contact of a charging base. Battery 102 also preferably includes a contact 255 which is either coupled to charging contact 252 or provides an open circuit. When coupled to a charging base, the charging base can identify the battery type based upon whether it is an open circuit. Additionally, a thermistor 256 could be coupled to ground contact 246. Thermistor 256 could provide information about the battery, such as the temperature of the battery, to enable efficient charging of the battery. Alternatively, contact 255 could be coupled a discrete resistor within the battery to enable control circuit 108 to identify the type of battery when contact 255 is coupled to a charging base based upon the value of the resistor. Battery 102 could also include a contact 258 which could be coupled to a charger and a contact 260 adapted to mate with a contact 262 of transceiver portion 200 for providing the temperature information to transceiver portion 200.

Battery 102 could include additional components such as an EEPROM 264 coupled to a contact 266 adapted to mate with a corresponding contact of a charging base. Battery 102 could additionally include a contact 268 adapted to mate with a contact 270 of the transceiver portion 200. EEPROM 264 could store information relevant to the battery to enable the charging base or transceiver portion to correctly charge the battery according to the present invention. Control circuit 108 could control charging circuit 112 differently depending upon the determination of the type of battery or information received from EEPROM 264. For example, less charging current may be required to vary the voltage of a lithium ion battery than a nickel cadmium battery or a nickel metal hydride battery.

Figure 3:
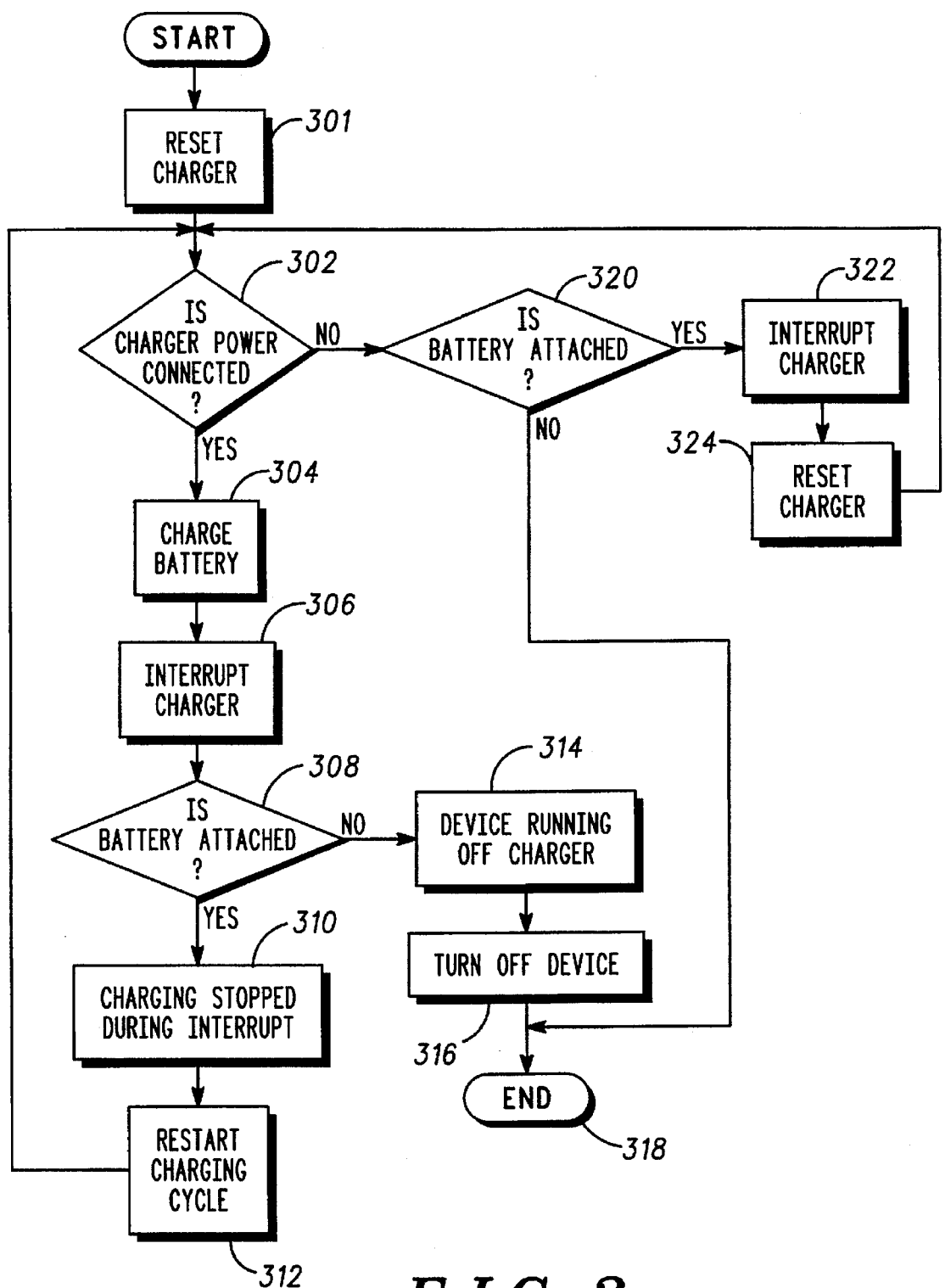
FIG. 3 is a flow chart showing the preferred charging algorithm according to the present invention.

Turning now to FIG. 3, a flow chart shows the preferred operation of the portable electronic device to charge the detachable battery. The portable electronic device will reset the charger at a step 301. The portable electronic device will respond differently depending upon whether charger power is connected to the device at a step 302. If charger power is connected, the charging circuitry of the electronic device will charge the battery at a step 304. The control circuit 108 will periodically send a strobe signal to charge controller/ timer 110 to periodically interrupt the charging current 112 at a step 306. During the interrupt, the charging current is dropped below the current requirements to maintain proper operation of the device. Control circuit 108 will also respond differently depending upon whether a battery is attached at a step 308. If a battery is attached, the charging is stopped during the interrupt caused by the strobe signal during step 310. The charging circuit will then restart the charging cycle and continue to charge the battery at a step 312 until the next interrupt. That is, the charging current would be applied for a first predetermined period before being interrupted for a second predetermined period. This cycle is preferably repeated periodically. If the battery is not attached, the device is determined to be running off the charger at a step 314. That is, the device detects that the battery is not attached by sensing a drop in the voltage at contact 240 of the device. Accordingly, the electronic device is turned off at a step 316.

If the charger power is not connected at step 302, the device may optionally determine whether a battery is attached at step 320. If a battery is attached, the phone will interrupt the charger at a step 322 and reset the charger at a step 324. Accordingly, the interruption of the charging cycle will preferably be performed even if charging power is not connected to allow a repetitive signal independent of the charging system to be used.

Preferably, the charging is periodically interrupted at steps 306 and 322 at a minimum rate which would detect the replacement of a battery by a user or prevent the overpowering of circuit or components of the device if the battery is removed. For example, the periodic interruption could occur every few milliseconds to prevent damage to the internal circuitry. However, if there is no risk of damage to the internal circuitry or components, the period of interruption could be a few seconds, or at least shorter than the minimum amount of time to detect a user charging a battery. This period may vary depending upon the battery, the battery latch, the wireless communication device, etc. The duration of the interruption could be, for example, as short as 10 millisecs or could be a few hundred millisecs. The duration of the interruption could depend upon a number of factors, including but not limited to, the amount of capacitance of the device which would keep the device on after power is removed, how much current the device draws when it is on, or the hardware and/or software configurations to turn off the device.

Although the invention has been described and illustrated in the above description and drawings, it is understood that this description is given by way of example only and that numerous changes and modifications can be made by those skilled in the art without departing from the true spirit and scope of the invention. Although the present invention finds particular application in portable cellular radiotelephones, the invention could be applied to any portable device, including pagers, electronic organizers, or computers. My invention should be limited only by the following claims.

I claim:

1. A method of charging a detachable battery of an electronic device, said method comprising the steps of:

applying a charging current to said detachable battery of said electronic device;

interrupting the charging current after a predetermined period of time of applying said charging current; and turning off said electronic device if said detachable battery is detached from said electronic device during said step of interrupting the charging current.

2. The method for charging a detachable battery of claim 1 wherein said step of applying a charging current comprises periodically applying a charging current for a first predetermined period of time.

3. The method for charging a detachable battery of claim 2 wherein said step of interrupting the charging current comprises interrupting the charging current for a second predetermined period of time after said first predetermined period of time.

4. The method for charging a detachable battery of claim 1 further comprising a step of resetting a charger applying said charging current if said detachable battery is not present.

5. A method of charging a detachable battery of an electronic device, said method comprising the steps of:

periodically applying a charging current to said detachable battery of said electronic device for a first period of time;

interrupting the charging current for a second period of time between each said first period of time of applying a charging current; and turning off said electronic device if said detachable battery is detached from said electronic device during said second period of time.

6. The method for charging a of claim 5 further comprising a step of resetting said charger if said detachable battery is not present.

7. A method of charging a detachable battery of an electronic device, said method comprising the steps of:

applying a source of power to an internal charging circuit;

applying a charging current to a detachable battery of said electronic device;

interrupting the charging current after applying said charging current for a predetermined period of time;

turning off said electronic device if said detachable battery is detached from said electronic device during said step of interrupting said charging current; and reapplying the charging current for said predetermined period of time if said detachable battery is attached to said electronic device during said step of interrupting said charging current.

8. A method of charging a detachable battery of an electronic device, said method comprising the steps of:

detecting the presence of a power supply;

applying a charging current from a charging circuit to a detachable battery of said electronic device;

interrupting the charging current after a predetermined period of time of applying said charging current;

detecting the presence of a battery attached to said electronic device at a power contact of the device;

turning off said electronic device and resetting said charging circuit if said battery is not present; and reapplying the charging current for said predetermined period of time.

9. An apparatus for charging a battery detachably associated with said apparatus, said apparatus comprising:

a power supply;

a charging circuit coupled to said power supply to apply charging power to said battery; and a control circuit operatively coupled to said charging circuit to periodically interrupt said charging power applied to said battery and to turn off said apparatus when said battery is detached from said apparatus during said interrupt.

10. The apparatus for charging a battery according to claim 9 further comprising a charge controller/timer coupled between said control circuit and said charging circuit to control the charging rate of said charging circuit.

11. The apparatus for charging a battery according to claim 10 wherein said control circuit periodically generates a strobe signal to periodically interrupt said charging power.

12. The apparatus for charging a battery according to claim 9 further comprising a transceiver circuit coupled to said control circuit to transmit and receive RF signals.

13. A portable electronic device having a detachable battery, said portable electronic device comprising:

a power supply;

a charging circuit coupled to said power supply to apply charging power to said detachable battery;

a charge controller/timer coupled to said charging circuit to control the charging rate of said charging circuit; and a control circuit operatively coupled to said charging circuit wherein said control circuit periodically generates a strobe signal to periodically interrupt said charging power applied to said battery and to turn off said apparatus when said battery is detached from said apparatus while said charging power is interrupted.

14. The portable electronic device for charging a battery according to claim 13 further comprising a transceiver circuit coupled to said control circuit to transmit and receive RF signals.

* * * * *